United States Patent
Funamoto

(10) Patent No.: US 6,867,803 B1
(45) Date of Patent: Mar. 15, 2005

(54) IMAGE PROCESSING UNIT

(75) Inventor: Kenji Funamoto, Asaka (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/492,787

(22) Filed: Jan. 28, 2000

(30) Foreign Application Priority Data

Jan. 29, 1999 (JP) ............................................. 11-022115

(51) Int. Cl.$^7$ .......................... H04N 5/335; H04N 3/14; H04N 9/04; H04N 5/222; G06K 9/32

(52) U.S. Cl. ...................... 348/294; 348/312; 348/272; 348/333.01; 382/299

(58) Field of Search ........................ 348/14.12, 208.13, 348/231.6, 272, 273, 304, 294, 312, 317, 319, 320, 322, 324, 333.01, 333.11, 333.12, 240.2; 382/299, 300; 250/208.1

(56) References Cited

U.S. PATENT DOCUMENTS

| | | | | |
|---|---|---|---|---|
| 4,907,089 A | * | 3/1990 | Yamaguchi et al. | ........ 348/312 |
| 5,206,730 A | * | 4/1993 | Sakai | ...................... 348/220.1 |
| 5,909,246 A | * | 6/1999 | Terashima | .................. 348/298 |
| 6,130,420 A | * | 10/2000 | Tanaka et al. | ........... 250/208.1 |
| 6,377,301 B1 | * | 4/2002 | Hieda | ..................... 348/231.99 |
| 6,618,085 B2 | * | 9/2003 | Ishimoto | ..................... 348/294 |
| 2001/0030700 A1 | * | 10/2001 | Mabuchi et al. | ............ 348/302 |
| 2002/0033894 A1 | * | 3/2002 | Watanabe et al. | ........... 348/312 |

FOREIGN PATENT DOCUMENTS

JP  851509  2/1996

* cited by examiner

*Primary Examiner*—Wendy R. Garber
*Assistant Examiner*—John M. Villecco
(74) *Attorney, Agent, or Firm*—Birch, Stewart, Kolasch & Birch, LLP

(57) ABSTRACT

In a moving image display mode, CPU commands a selector to input an output signal of a frequency divider to a signal processing part as a synchronous signal. In case of a CCD with G-stripe or Bayer arrangement, the frequency divider divides the frequency of a clock by an odd number (for example, 3 or 5) and the frequency-divided clock is inputted to the signal processing part. This thins out the pixels of image data to {1/(an odd number)} and the image data is inputted to the signal processing part without changing the arrangement of the pixels. The inputted image data is processed at the signal processing part, and then is outputted to the liquid crystal monitor, which displays a moving image.

8 Claims, 2 Drawing Sheets

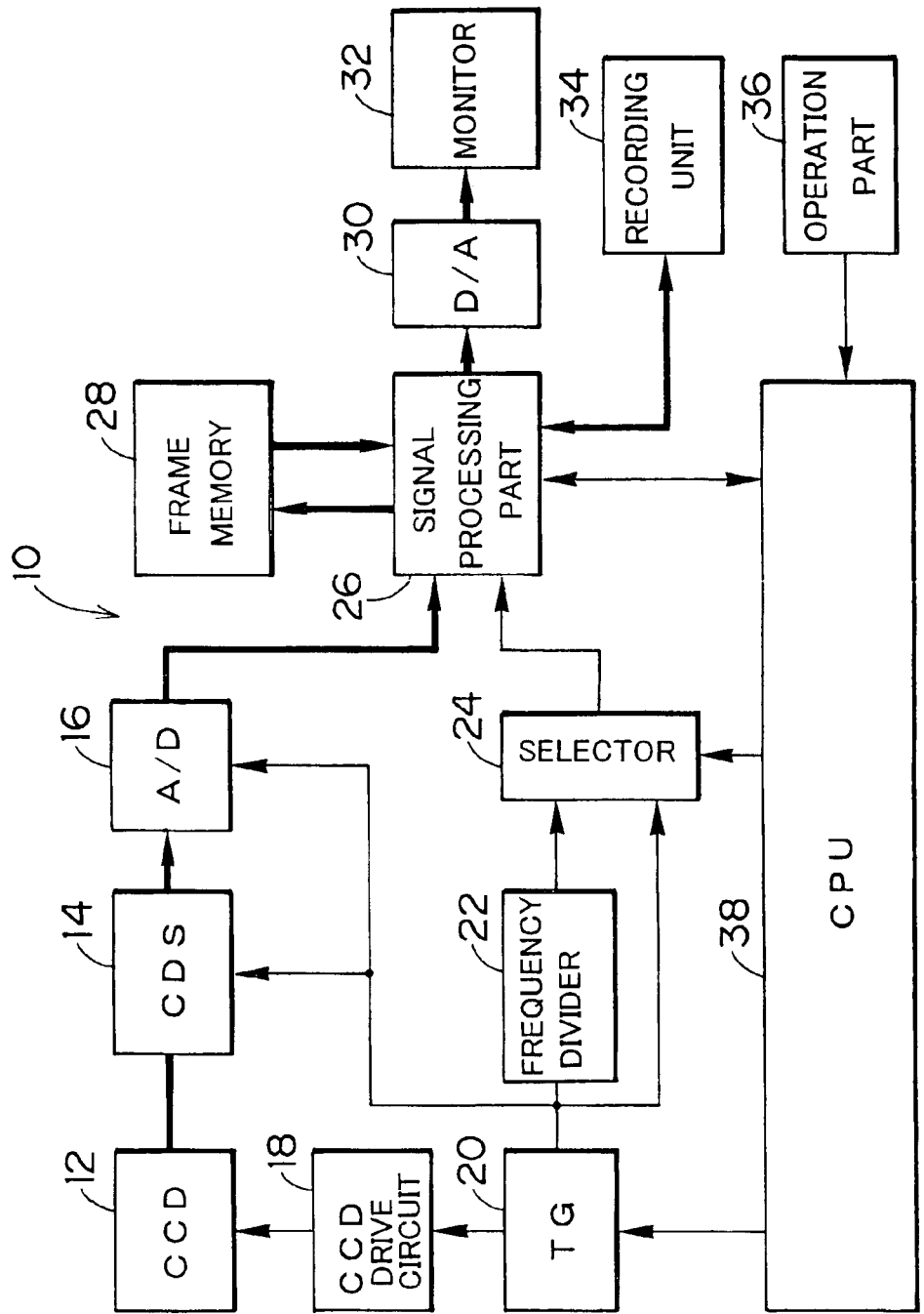
F I G. 1

IMAGE PROCESSING UNIT

BACKGROUND OF THE INVENTION

1. Field of the Invention

The present invention generally relates to an image processing unit, and more particularly to an image processing unit suitable for an image recording and regenerating unit, such as a digital camera, which can thin out an image data inputted by means of a CCD imaging device with a multiple pixels and display a moving image according to a resolution of a display unit.

2. Description of Related Art

An art for obtaining an image data by converting an optical image into an electron image signal by means of an imaging device such as a CCD and processing the electron image signal is widely known. In Japanese Patent Provisional Publication No. 8-51509, when an A/D converter converts analog R, G and B signals into a digital signal, a sampling signal generating circuit thins out R and B data to reduce a data amount in order to enable the reduction of a memory capacity.

Conventionally, when an image data inputted from a single plate CCD with a multiple pixels is displayed as a moving image, the image data is properly thinned to reduce the image data in accordance with a resolution of a display unit. The reduction of the image data may be performed in various manners. For example, if pixels of the CCD are arranged in G-stripe arrangement, R (red) data, G (green) data and B (blue) data for all the pixels are generated (three-lined) from a CCD output data (one-line data) which has dot-sequential R, G, B, G, R, G, B, G, . . . color information outputted from an output part of a horizontal transfer passage and then the three-lined data are thinned out at an appropriate thinning rate.

On the other hand, if pixels of the CCD are arranged in Bayer arrangement, a method is usually adopted in which a one-line data of an RG line which has R, G, R, G, R, G, . . . color information or a GB line which has G, B, G, B, G, B, . . . color information is two-lined and then the two-lined data is thinned out.

These conventional methods, however, in which the whole data obtained from the output part of the horizontal transfer passage is inputted to a signal processing part, which three-lines (or two-lines) the whole data and then thins out the whole data, depend on a thinning function such as a signal processing LSI, a reduction function, a capacity of a built-in buffer and so on. In addition, as the number of pixels of a CCD rises with a demand for high image quality, a frequency of a clock for driving the CCD rises to acquire a resolution (an active resolution) for displaying a moving image. Signal processing with a clock with a high frequency increases the consumption of electricity.

SUMMARY OF THE INVENTION

The present invention has been developed in view of the above-described circumstances, and has as its object the provision of an image processing unit which is capable of thinning pixels of an image data obtained from a single plate CCD with a multiple pixels without changing the arrangement of the pixels to enable a reduction of a memory capacity and reduce the consumption of electricity.

To achieve the above-described object, the present invention is directed to an image processing unit, comprising: a frequency dividing device that divides a frequency of a drive clock for an imaging device; an A/D converting device that converts an image signal outputted from said imaging device according to said drive clock into a digital image data; and a signal processing part that captures said digital image data outputted from said A/D converting device in synchronization with a frequency-divided clock outputted from said frequency dividing device, and that processes said digital image data.

According to the present invention, the A/D converting device converts the analog imaging signal read from the imaging device into the digital data synchronous with the drive clock for the imaging device and inputting the frequency-divided clock to the signal processing part when the digital data is inputted to the signal processing part. The data inputted to the signal processing part is thinned in accordance with a frequency-dividing rate since the image data is inputted to the signal processing part in synchronization with the frequency-divided clock. Thus, the pixels of the image data obtained from the single plate CCD can be thinned out without changing the arrangement of the pixels to enable a reduction of a memory capacity and reduce the consumption of electricity.

Specially, dividing the frequency of the drive clock by an odd number thins out the pixels of the image data obtained from the single plate CCD to {1/(the odd number)}, whether the pixels are arranged in G-stripe or Bayer arrangement.

To achieve the above-described object, the present invention is directed to an image processing unit, comprising: an imaging device; a timing generating device that generates a drive clock for driving said imaging device; a frequency dividing device that divides a frequency of said drive clock; an A/D converting device that converts an image signal outputted from said imaging device according to said drive clock into a digital image data; a selection device that selectively inputs one of said drive clock and a frequency-divided clock outputted from said frequency dividing device to a signal processing part; said signal processing part that captures said digital image data outputted from said A/D converting device in synchronization with the one of said drive clock and said frequency-divided clock outputted from said frequency dividing device, and that processes said digital image data; a display that displays an image according to an image data outputted from said signal processing part to which said digital image data is inputted; and a recording device that records said image data outputted from said signal processing part to which said digital image data, outputted from said A/D converting device to which said image signal is outputted from said imaging device in response to an imaging start command signal, is inputted in synchronization with said drive clock.

According to the present invention, the data is artificially thinned out by dividing the frequency of the clock and inputting the frequency-divided clock to the signal processing part to acquire an reduced image in accordance with a resolution of the display unit while a moving image is displayed. On the other hand, when an image is recorded, that is when the image data imaged in response to the imaging start command signal is recorded in the recording unit, the drive clock is inputted to the signal processing part without dividing the frequency to acquire an image with a multiple pixels.

This enables the system to display a moving image in accordance with the resolution of the display unit without any restriction of a capacity of a built-in memory of the signal processing part and the conventional thinning function. Moreover, the frequency of the clock inputted to the signal processing part is lower than that of the conventional image processing unit while the moving image is displayed, and thus it reduces the consumption of the electricity at the signal processing part.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a block diagram showing the structure of an image processing unit according to the embodiment of the present invention;

DETAILED DESCRIPTION OF THE PREFERRED EMBODIMENT

Figure 2:
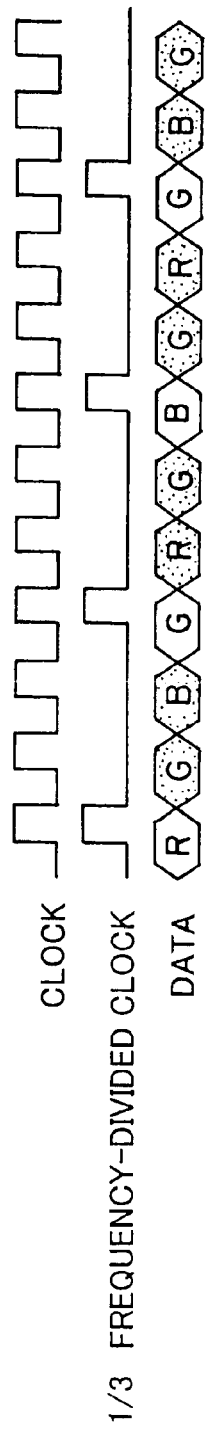
FIG. 2 is a timing chart showing an example of thinning procession of the image data in case of a CCD whose pixels are arranged in G-stripe arrangement.

Hereunder the preferred embodiment of the present invention is explained in detail according to the accompanying drawings.

FIG. 1 is a block diagram showing the structure of an image processing unit 10 according to the embodiment of the present invention. The image processing unit 10 is applied to an electric camera with an image recording function and an image regenerating function, and mainly comprises a charge coupled device solid state imaging device (which will later be referred to as a CCD) 12, an analog processing part 14 with a CDS circuit, an A/D converter 16, a CCD drive circuit 18, a timing generator (TG) 20, a frequency divider 22, a selector 24, a signal processing part 26, a frame memory 28, a D/A converter 30, an liquid crystal display (LCD) 32, a recording unit 34, an operation unit 36, a central processing unit (CPU) 38 and so forth.

The number of the pixels of the CCD 12 should be selected according to the required image quality. The CCD 12 has, for example, 2.3 million or so pixels, which are arranged in G-stripe arrangement with 1920 horizontal pixels. An optical image, formed on a light-receiving surface of the CCD 12 through a taking lens (not illustrated), is converted into signal electric charges according to light incident amounts at the pixels of the CCD 12. The accumulated signal electric charges are transferred to vertical transfer routes in a row by read gate pulses from the CCD drive circuit 18. Then, clock pulses for a period are applied to electrodes of the vertical transfer routes to transfer the signal electric charges for one line to a horizontal transfer route (this action is referred to as a line shift). Then, a two-phase clock pulse (corresponding to a drive clock) is applied to an electrode of the horizontal transfer route to output signals for one horizontal line through an output part. The line shift and the horizontal transfer are repeated to read all the signal electric charges in the vertical transfer routes. In this way, voltage signals (analog image signals), corresponding to the accumulated electric charges at the pixels, are outputted sequentially from the output part of the CCD 12.

In the CCD 12, a shutter drain is provided through a shutter gate, and driving the shutter gate with a shutter gate pulse wipes the accumulated signal electric charges to the shutter drain. Thus, the CCD 12 has what is called an electric shutter function that controls the accumulation time (shutter speed) of the electric charges accumulated in the pixels by the shutter gate pulse.

The signals read from the CCD 12 are inputted to the analog processing part 14. The CDS circuit performs a sampling holding for each pixel and separates the signals into R, G and B signals, which is inputted to a gain control amplifier. The gain control amplifier amplifies the inputted R, G and B signals with appropriate gains to adjust the white balance.

The R, G and B signals outputted from the gain control amplifier is converted to R, G and B dot-sequential digital signals, which is inputted to the A/D converter 16. The A/D converter 16 sequentially converts the inputted R, G and B digital signals into digital signals, which are inputted to the signal processing part 26.

A clock is outputted from the timing generator 20 controlled by the CPU 20 to the CCD drive circuit 18, the analog processing part 14 and the A/D converter 16 to thereby synchronize the circuits. The clock is also outputted from the timing generator 20 to the frequency divider 22, that outputs a clock with 1/3 the frequency of the inputted clock. The outputted clock (frequency-divided clocks) is inputted to one input terminal of the selector 24.

The clock outputted from the timing generator 20 is inputted to the other input terminal of the selector 24, and output of the selector 24 is switched according to a command (a selection signal) from the CPU 38.

The image signals are outputted from the A/D converter 16 to the signal processing part 26 according to the clock from the selector 24, and the signal processing part 26 performs a predetermined processing. If the clock which has passed the frequency divider 22 is outputted from the selector 24, signals of pixels that synchronize with the frequency-divided clocks among the outputted signals from the A/D converter 16 are inputted to the signal processing part 26. On the other hand, the drive clock which has not passed the frequency divider 22 is outputted from the selector 24, the signals of all the pixels are inputted to the signal processing part 26.

The signal processing part 26 includes digital image processing circuits such as a luminance and color difference signal generating circuit (a YC processing circuit), a γ correction circuit, a photometric value calculation circuit and a compression/expansion circuit. The signal processing part 26 produces a luminance signal and a chroma signal (color difference signals B-Y, R-Y). Image data obtained by the processing of the signal processing part 26 is stored in the frame memory 28. The image data outputted from the signal processing part 26 is converted into analog signals at the D/A converter 30, and is then inputted to the liquid crystal display 32 that displays the image being captured by the CCD 12 on the monitor screen.

The CPU 38 comprehensively controls the circuits in the image processing unit 10, calculates an exposure value, a focal position and so forth according to a predetermined algorithm and controls automatic exposure, auto focussing, auto strobe, auto white balance and so forth. The CPU 38 also controls mechanism part for zooming, focusing, etc., the display of the liquid crystal monitor 32 and the writing/reading of the recording unit 34 according to inputted signals from the operation part 36.

In other words, the CPU 38 controls the electric charge accumulation time of the CCD 12 and a diaphragm (not illustrated) according to the exposure value calculated from the image signals inputted to the signal processing part 26, and also controls the gain control amplifier of the analog processing part 14 according to a calculated RB gain value to set the white balance. The CPU 38 also calculates a focus evaluation value which indicates a sharpness of the subject image from the image signals and calculates the focal position according to the focus evaluation value. The CPU 38 controls a focus optical system via a focus drive circuit based on the calculating focal position to set the focal position. The auto focus means is not limited to this; it may be a known focal means such as an AF sensor.

Further, the CPU 38 controls a zoom optical system via a zoom drive control circuit according to a focal distance of the taking lens which is set by the user with a zoom switch included in the operation part 36.

When an imaging start command signal is inputted to the CPU 38 by the process of the pushing operation of a shutter release button which is included in the operation part 36 or the like, the image signals read from the CCD 12 are inputted to the signal processing part 26 in synchronization with the drive clock which has not passed the frequency divider in response to the input of the imaging start command signal. After a predetermined processing, the image signals are compressed as need arises and recorded in the recording unit 34. The recording unit 34 may be a detachable external recording medium such as a memory card, and may be an internal memory built-in a camera body. The imaging start command signal may be inputted from an outside of the unit, such as a remote control and an external connection instrument.

The image data stored in the recording unit 34 can be read in accordance with the control of the CPU 38. The read image data is expanded, and then outputted to the liquid crystal monitor 32. In this way, the image data stored in the recording unit 34 can be regenerated.

A description will now be given of the operation of the image processing unit 10 which is constructed in the above-mentioned manner.

The image data of all the pixels read from the CCD 12, that is the image data outputted from the A/D converter 16 has 1920 horizontal pixels, while the resolution of the liquid crystal monitor 32 has 640 horizontal pixels in the video graphic array (VGA) resolution. Thus, the 1920 horizontal pixels of the image data need to be thinned out to the 640 horizontal pixels. In the image processing unit 10 according to the embodiment, the frequency divider 22 outputs the clock with 1/3 the frequency of the clock from the timing generator 20, and the outputted clock is inputted to the signal processing part 26. The image data inputted to the signal processing part 26 has 640 horizontal pixels.

FIG. 2 shows the thinning processing. The A/D converter 16 converts the image data from the CCD 12 into the drive clock and the digital signal synchronous with the drive clock. In a moving image display mode, the CPU 38 commands the selector 24 to input the output signal (the 1/3 frequency-divided clock) to the signal processing part 26 as a synchronous signal.

R (red), G (green), B (blue), G, R, G, B, G, . . . color information is outputted from the A/D converter 16 in repetition in the order of R, G, B and G color information in one horizontal line. If the image data is inputted to the signal processing part 26 in synchronization with the 1/3 frequency-divided clock, the image data is inputted in the order of R, G, B, G, . . . color information, the same order as the data outputted from the A/D converter 16. In this way, the data with 640 horizontal pixels is inputted to the signal processing part 26. After a predetermined procession, the input data is outputted to the liquid crystal display 32, which display the moving image. The vertical pixels of the CCD 12 is thinned out by not storing unneeded data in the memory after the input to the signal processing part 26, or the like.

On the other hand, if the imaging start command signal is inputted to the CPU 38 from the shutter release button or the like, the CPU 38 commands the selector 24 to input the clock which has not passed the frequency divider 22 to the signal processing part 26. Thus, the image data which has not been thinned out is inputted to the signal processing part 26 to store the high quality image in the recording unit 34.

In the image processing unit 10 according to the embodiment, the frequency of the clock is divided and the input data is thinned out in accordance with the resolution of the monitor. This reduces the processing burden on the signal processing part 26, and enables structuring a system for a moving image processing that is not restricted by the built-in memory or the thinning function. This also reduces the consumption of electricity at the signal processing part 26 since the frequency of the clock inputted to the signal processing part 26 is decreased.

The CCD 12 whose pixels are arranged in G-stripe arrangement is explained, but this invention should not be restricted to this. The data of a CCD whose pixels are arranged in Bayer arrangement may be thinned out without changing the arrangement by thinning out horizontal outputs to {1/(an odd number)}.

Figure 3:
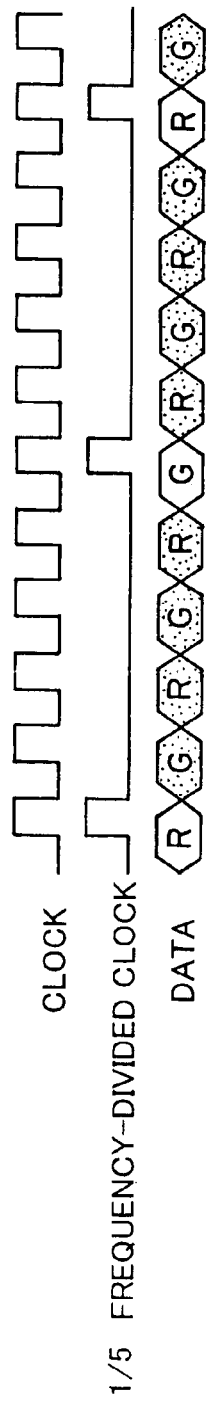
FIG. 3 is a timing chart showing an example of thinning procession of the image data in case of a CCD whose pixels are arranged in Bayer arrangement.

FIG. 3 shows an example of thinning procession of the image data in case of the CCD whose pixels are arranged in Bayer arrangement. In this case, a frequency divider, that divides the frequency of the drive pulse of the CCD 12 by 5, is adopted in stead of the 1/3 frequency divider 22 in FIG. 1.

In the moving image display mode, the CPU 38 commands the selector 24 to input the output signal (the 1/5 frequency-divided clock) to the signal processing part 26 as a synchronous signal.

When RG lines are read, R, G, R, G, R, G, . . . color information is outputted from the A/D converter 16 in repetition in the order of R and G color information as shown in FIG. 3. If the image data is inputted to the signal processing part 26 in synchronization with the 1/5 frequency-divided clock, the image data is inputted in the order of R, G, R, G, . . . color information, the same order as the data outputted from the A/D converter 16.

Likewise, when GB lines are read, G, B, G, B, G, B, . . . color information is outputted from the A/D converter 16 in repetition in the order of G and B color information (not illustrated). If the image data is inputted to the signal processing part 26 in synchronization with the 1/5 frequency-divided clock, the image data is sequentially inputted in the order of G, B, G, B, G, B, . . . color information. This enables thinning out the pixels without changing the arrangement of the pixels.

The example where the frequency of the clock outputted from the timing generator 20 is divided by 3 or 5 with the CCD with the G-stripe or Bayer arrangement according to the arrangement and the frequency-divided clock is inputted to the signal processing part 26, but this invention should not be restricted to these frequency dividing rates. In the case of a widely used arrangement such as the G-stripe and Bayer arrangements, data can be thinned out without changing the arrangement of the pixels by dividing the frequency by an odd number. 1 is an odd number, but it is excluded since 1/1 is not included in a concept of dividing.

In case of an imaging device with another color filter arrangement, a frequency-dividing rate is set according to the arrangement so that the data outputted from the imaging device can be thinned out without changing the arrangement. The frequency dividing rate may be {1/(an odd number)}, and may be {1/(an even number)}.

As explained above, according to the image processing unit of the present invention, the frequency of a drive clock is divided to generate a clock with less frequency than that of the drive clock and the frequency-divided clock is inputted to a signal processing part to thin out pixels of image data at the input to the signal processing part. This enables reduction of the capacity of a built-in memory and reduces the consumption of electricity.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image processing unit, comprising:
    a frequency dividing device that divides a frequency of a drive clock for an imaging device;
    an A/D converting device that converts an image signal outputted from said imaging device according to said drive clock into a digital image data; and
    a signal processing part that captures said digital image data outputted from said A/D converting device in synchronization with a frequency-divided clock outputted from said frequency dividing device, and that processes said digital image data,
    wherein the image data is thinned out upon application of the frequency-divided clock signal to the signal processing part.

2. The image processing unit as set forth in claim 1, wherein said imaging device is a CCD solid state imaging device whose pixels are arranged in one of G-stripe arrangement and Bayer arrangement.

3. The image processing unit as set forth in claim 1, wherein said frequency dividing device divides the frequency of said drive clock by an odd number.

4. The image processing unit as set forth in claim 2, wherein said frequency dividing device divides the frequency of said drive clock by an odd number.

5. The image processing unit as set forth in claim 1, further comprising a display that displays an image according to an image data outputted from said signal processing part.

6. An image processing unit, comprising:
    an imaging device;
    a timing generating device that generates a drive clock for driving said imaging device;
    a frequency dividing device that divides a frequency of said drive clock;
    an A/D converting device that converts an image signal outputted from said imaging device according to said drive clock into a digital image data;
    a selection device that selectively inputs one of said drive clock and a frequency-divided clock outputted from said frequency dividing device to a signal processing part;
    said signal processing part that captures said digital image data outputted from said A/D converting device in synchronization with the one of said drive clock and said frequency-divided clock outputted from said frequency dividing device, and that processes said digital image data;
    a display that displays an image according to an image data outputted from said signal processing part to which said digital image data is inputted; and
    a recording device that records said image data outputted from said signal processing part to which said digital image data, outputted from said A/D converting device to which said image signal is outputted from said imaging device in response to an imaging start command signal, is inputted in synchronization with said drive clock,
    wherein the image data is thinned out upon application of the frequency-divided clock signal to the signal processing part.

7. The image processing unit as set forth in claim 1, further comprising:
    a horizontal drive pulse for driving a horizontal transfer passage of the imaging device, the horizontal drive pulse being divided by the frequency dividing device,
    wherein the image data in a horizontal direction is thinned upon application of the divided clock to the signal processing part.

8. The image processing unit as set forth in claim 6, further comprising:
    a horizontal drive pulse for driving a horizontal transfer passage of the imaging device, the horizontal drive pulse being divided by the frequency dividing device,
    wherein the image data in a horizontal direction is thinned upon application of the divided clock to the signal processing part.

* * * * *